Nov. 7, 1967   H. BRAUER   3,350,920
APPARATUS FOR TESTING TUBULAR WORKPIECES
Filed May 12, 1965   3 Sheets-Sheet 1

INVENTOR:
HANS BRAUER

BY
Michael J. Striker
his ATTORNEY

Nov. 7, 1967  H. BRAUER  3,350,920
APPARATUS FOR TESTING TUBULAR WORKPIECES
Filed May 12, 1965  3 Sheets-Sheet 3

INVENTOR:
HANS BRAUER

BY
Michael J. Striker
his ATTORNEY

United States Patent Office 3,350,920
Patented Nov. 7, 1967

3,350,920
APPARATUS FOR TESTING TUBULAR
WORKPIECES
Hans Brauer, Solingen, Germany, assignor to Th.
Kieserling and Albrecht, Solingen, Germany
Filed May 12, 1965, Ser. No. 455,164
Claims priority, application Germany, May 16, 1964,
K 52,982
14 Claims. (Cl. 73—49.1)

ABSTRACT OF THE DISCLOSURE

A hydrostatic testing apparatus for pipes wherein a movable carrier is reciprocable toward a fixed carrier to place the sealing heads of carriers into sealing engagement with the ends of a pipe. Each carrier supports a set of jaws which engage the pipe adjacent to the respective sealing heads in response to admission of testing fluid into the interior of the pipe and with a force which is proportional to the pressure of testing fluid. A gripper engages an intermediate portion of the pipe and is reciprocable with but a half the speed of the movable carrier.

---

The present invention relates to apparatus for testing metallic or plastic pipes and similar elongated tubular workpieces. More particularly, the invention relates to improvement in apparatus of the type wherein thin-walled pipes may be tested to detect eventual leaks by means of a hydraulic testing fluid which is admitted into such pipes at elevated pressure.

It is already known to test metallic or plastic pipes in apparatus wherein both ends of a pipe are engaged by sealing heads supported on wheel-mounted carriages. The carriages for such sealing heads also support several sets of gripping claws which are movable into and out of engagement with the pipe by hydraulic devices operated by a pressure medium other than the testing fluid. In order to prevent bending or buckling of pipes during testing, the claws are subjected to the action of forces which tend to stretch the pipe. Such apparatus are very complicated and expensive because the devices which actuate the gripping claws are connected into a separate hydraulic circuit and because the medium which effects movements of the gripping claws and of the wheel-mounted carriages for the sealing heads must be subjected to very high compression such as can be produced only by strong pumps or similar compressing devices. Also, the apparatus must be furnished with one or more spare sets of gripping claws if it is to be useful for testing of pipes having different diameters. The several sets of gripping claws and the means for actuating the claws constitute very expensive accessories for such apparatus.

Accordingly, it is an important object of my present invention to provide an apparatus for testing pipes and similar tubular workpieces which is constructed and assembled in such a way that any flexing, bending and/or buckling of relatively thin-walled workpieces may be prevented by devices which are actuated by the testing fluid so that a single hydraulic circuit suffices to carry out the testing operation and to properly support and protect the pipes during testing.

Another object of the invention is to provide a testing apparatus of the just outlined characteristics wherein only one of the sealing heads must move with reference to the frame so that the apparatus is simpler, more rugged and less expensive than any such conventional testing apparatus of which I have knowledge at this time.

A further object of the invention is to provide an apparatus wherein the devices which prevent buckling or bending of pipes during testing may be utilized in connection with pipes of different diameters and with pipes of different length so that a single set of such devices suffices to test different types of tubular workpieces.

An additional object of the invention is to provide novel clamping and gripping assemblies which can be utilized in an apparatus of the above outlined characteristics to prevent uncontrolled deformation of pipes during testing.

Still another object of the invention is to provide a single gripping assembly which will automatically engage that portion of the pipe which is subjected to maximal bending, buckling and other deforming stresses.

A concomitant object of the invention is to provide a testing apparatus of the above outlined type wherein all of the operations necessary for properly locating, supporting, testing and removing a pipe can be carried out in a fully automatic way so that the pipes may be tested in rapid sequence.

Still another object of my invention is to provide a testing apparatus wherein a relatively small force is required to protect the pipe against uncontrolled deformation in the course of a testing operation, and wherein the magnitude of clamping stresses is related to the pressure of testing fluid in such a way that it is just sufficient to prevent deformation but will not subject the pipe to excessive compression which might result in damage or deformation, not in response to the pressure of testing fluid but in response to stresses transmitted by the clamping assembly.

Briefly stated, one feature of my invention resides in the provision of an apparatus for detecting leaks in pipes and similar elongated tubular workpieces by means of a hydraulic testing fluid. The apparatus comprises a first carrier and a movable carrier, a hollow sealing member provided on each carrier and adapted to sealingly engage one end of a pipe which is placed between the carriers, means for reciprocating the movable carrier toward and away from the first carrier so that the sealing members engage the respective ends of the pipe when the movable carrier is advanced sufficiently close to the first carrier, a plurality of jaws provided on each carrier and each movable into and out of clamping engagement with a portion of the pipe adjacent the respective sealing member, a source of pressurized testing fluid, first valve means for admitting such fluid through one of the sealing members and into the pipe, second valve means for intermittently preventing escape of fluid through the other sealing member so that the fluid pressure in a satisfactory pipe rises, and hydraulic actuating means operatively connected with the source of testing fluid for moving the jaws against the pipe with a force which is directly proportional to the fluid pressure in the pipe.

The novel features which are considered as characteristic of the invention are set forth in particular in the appended claims. The improved testing apparatus itself, however, both as to its construction and its mode of operation, together with additional features and advantages thereof, will be best understood upon perusal of the following detailed description of a specific embodiment with reference to the accompanying drawings, in which:

Figure 1:
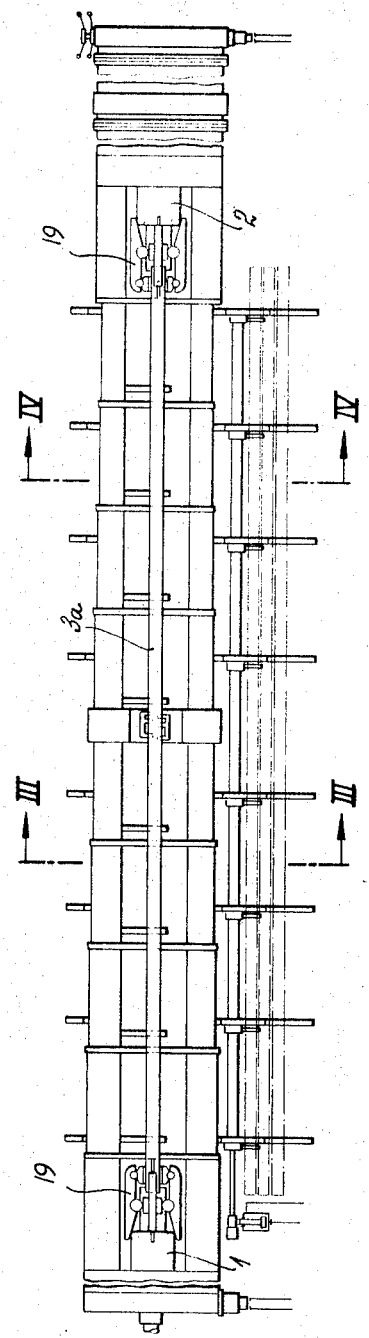
FIG. 1 is a top plan view of a testing apparatus which embodies my invention, the apparatus being shown in a position in which its sealing heads engage the end portions of a relatively long tubular workpiece.
Figure 3:
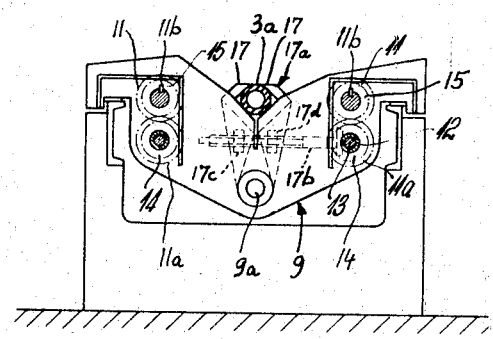
Figure 4:
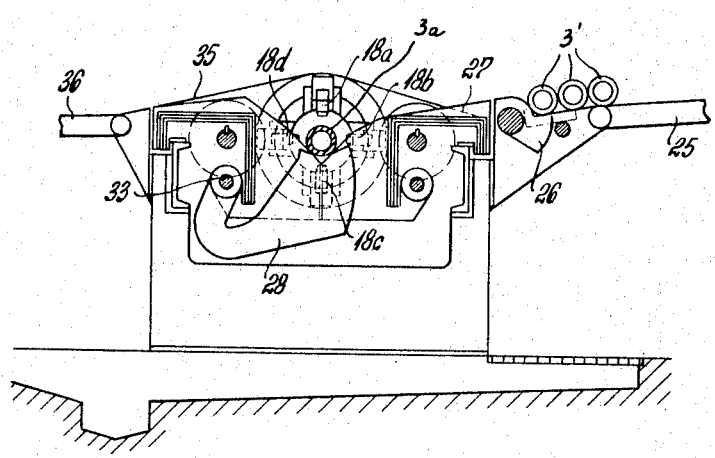

FIG. 3 is a transverse vertical section as seen in the direction of arrows from the line III—III of FIG. 1 and illustrates the transmission between the spindles and that member which carries the gripping assembly; and FIG. 4 is a transverse vertical section as seen in the direction of arrows from the line IV—IV of FIG. 1 and illustrates one of a series of holders which serve to support a tubular workpiece during testing and to remove a tested workpiece from the testing station.

Figure 2:
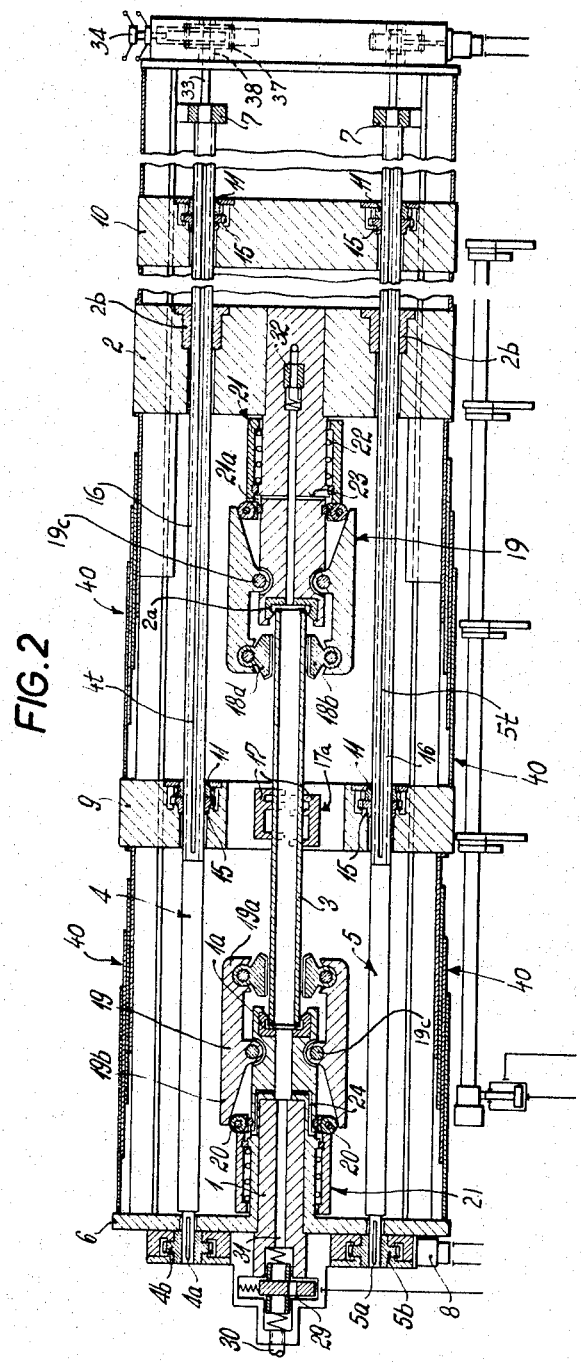
FIG. 2 is a larger-scale horizontal section through the apparatus and illustrates the sealing heads in engagement with the end portions of a relatively short workpiece.

Referring to the drawings, and first to FIGS. 1 and 2, the testing apparatus of my invention comprises a stationary carrier 1 and a reciprocable carrier 2. The numeral 3a denotes in FIG. 1 an elongated tubular workpiece (hereinafter called pipe) which is to be tested in order to determine the presence or absence of leaks. The carriers 1 and 2 are connected to each other by parallel spindles 4 and 5 which take up axial stresses in the course of a testing operation. The end portions of these spindles are journalled in stationary bearing members 6 and 7, see FIG. 2, and the left-hand end portions 4a, 5a of the spindles are nonrotatably secured to worm wheels 4b, 5b. The worm wheels 4b, 5b mesh with worms, not shown, which are driven by a reversible motor 8, for example, by a hydraulic motor of any known design. Depending on the direction in which the worm wheels 4b, 5b rotate, the carrier 2 will move toward or away from the stationary carrier 1. The spindles 4 and 5 extend through reciprocable supporting members or platens 9 and 10 which will move with and in the same direction as the carrier 2 when the worm wheels 4b, 5b are driven by the motor 8. The platens 9 and 10 are located at the opposite ends of the carrier 2, i.e., the platen 9 is located between the two carriers and the platen 10 is located between the carrier 2 and the bearing members 7. The driving connection between the spindles 4, 5 and the platens 9, 10 is such that the speed of the platens equals one-half the speed of the carrier 2. The main purpose of the platens 9 and 10 is to prevent flexing of the spindles, and the platen 9 also serves to support a gripping device 17a which will be described later. The right-hand portions of the spindles 4 and 5 are provided with axially extending keyways or splines, as at 4t and 5t, and such splines receive radially extending keys 11b for gears 11 each of which meshes with a gear 11a (see FIG. 3) provided on one of two hollow cylindrical shafts 12. The shafts 12 are rotatably telescoped onto elongated solid cylindrical rods 13 which are parallel with the spindles 4 and 5. Each hollow shaft 12 further carries gears 14 which are non-rotatably secured thereto, and each gear 14 meshes with a gear 15. The gears 15 are provided with internal threads which mesh with external threads 16 of the spindles 4 and 5, and each of these gears 15 is rotatably mounted in the platen 9 or 10 in such a way that it is held against axial movement with reference to the corresponding platen. The gears 11, 11a, 14, 15 constitute a step-down transmission which insures that the speed of the platens 9 and 10 equals one-half the speed of the carrier 2 when the spindles 4 and 5 are driven by the hydraulic motor 8.

The platen 9 carries the gripping device 17a which comprises two radially movable claws 17 adapted to engage the pipe 3 shown in FIG. 2 substantially midway between the end portions thereof when the pipe 3 is subjected to a test. Also, the gripping device 17a is used to withdraw one end portion of the pipe 3 from a stationary sealing head 1a which is supported by the fixed carrier 1 and to withdraw the other end portion of the pipe from a reciprocable sealing head 2a which is supported by the carrier 2. Such withdrawal of the pipe 3 from the sealing heads 1a and 2a will take place upon completion of a testing operation.

In order to further reduce the possibility that the pipe 3 would bend or buckle during testing, each of the carriers 1 and 2 supports a series of angularly spaced, equidistant, radially reciprocable clamping jaws 18a, 18b, 18c, 18d which can engage the pipe adjacent to the respective end portions thereof. As shown in FIG. 2, the sealing heads 1a, 2a surround the end portions of the pipe 3 and the clamping jaws 18a–18d engage the pipe in zones which are adjacent to such end portions. Each of the two sets of clamping jaws 18a–18d is pivotably mounted on one arm 19a of a two-armed lever 19 which is pivotable on a pin 19c, and the other arm 19b of each lever 19 is engaged by one of four rollers 20 mounted on an actuating cylinder 21. The underside of each arm 19b is provided with a cam face which will cause the respective lever 19 to pivot if the corresponding cylinder 21 is moved toward the respective sealing head 1a or 2a. Springs 22 or other suitable biasing means tend to move the cylinders 21 away from the respective sealing heads and into the starting or inoperative positions shown in FIG. 2. Each of the carriers 1 and 2 defines with the respective cylinder 21 an annular cylinder chamber 21a which receives testing fluid through a system of channels 24 and 23 so that the jaws 18a–18d will clamp the adjoining portions of the pipe 3 when the testing fluid is admitted into such pipe. As soon as the pressure of the testing fluid decreases, the springs 22 are free to move the cylinders 21 away from each other whereby the jaws 18a–18d release the pipe. If desired, the apparatus may comprise suitable springs which tend to spread the jaws 18a–18d of each set apart and which also insure that the cam faces of the arms 19b remain in engagement with the corresponding rollers 20.

The movable carrier 2 accommodates two spindle nuts 2b which are in mesh with the threaded portions 16 of the spindles 4 and 5 so that, when the spindles are driven by the hydraulic motor 8, the carrier 2 is compelled to move in a direction toward or away from the fixed carrier 1. The nuts 2b are fixed to the carrier 2.

FIG. 2 shows further that the actual testing station is disposed between expansible shields 40 which extend between the opposite ends of the platen 9 and the parts 2 and 6.

When the spindles 4 and 5 rotate in one direction, the gears 11 rotate in the same direction and drive the corresponding gears 11a in the opposite direction. The gears 11a drive the associated gears 14 which mesh with the gears 15 and cause the gears 15 and the platens 9 and 10 to travel in the axial direction of the spindles toward the carrier 1. When the spindles 4 and 5 are driven in the opposite direction, the same transmission will cause the platens 9 and 10 to move away from the fixed carrier 1.

FIG. 3 shows that the claws 17 of the gripping device 17a are mounted on a horizontal shaft 9a which is supported by the platen 9. The means for moving the claws 17 toward and away from each other by pivoting the claws about the axis of the shaft 9a comprises a transversely extending spindle 17b which may be rotated by a crank handle or by a motor (not shown) and which comprises portions provided with right-hand and left-hand threads respectively meshing with spindle nuts 17c, 17d mounted in the claws 17. Thus, when the spindle 17b rotates, the claws 17 will move into or out of gripping engagement with the central portion of the pipe 3a.

The apparatus of my invention is operated as follows:

A supply of pipes 3' which are to be tested one after the other is supported on an inclined grate or magazine 25, see FIG. 4. A pivotable transfer member 26 can be operated at regular intervals to remove the foremost pipe 3' from the grate 25 and to transfer such pipe onto the inclined surfaces of fixed guides 27 along which the foremost pipe 3' rolls onto a series of pivotable holders 28. During such transfer of the foremost pipe 3', the distance between the two sets of jaws 18a–18d exceeds the axial length of the pipe 3a (FIG. 1) or pipe 3 (FIG. 2) so that the pipe may come to rest in a position corresponding to that of the pipe 3 or 3a. In the next-following step, the motor 8 is started to move the carrier 2 in a direction toward the fixed carrier 1 so that the right-hand end portion of the pipe 3a (FIG. 4) resting on the holders 28 enters the sealing head 2a and the pipe begins to move toward the carrier 1 until its left-hand end portion enters the fixed sealing head 1a. The pipe is now ready for testing and the spindle 17b (FIG. 3) is then rotated in a sense to move the claws 17 into engagement with the central portion of the pipe. As shown in FIG. 2, the platen 9 is then located midway between the two sets of clamping jaws 18a–18d. For the sake of simplicity, the pipe 3 shown in FIG. 2 has been illustrated as being shorter than the pipe 3a shown in FIG. 1.

A normally closed valve 29, illustrated in the left-hand portion of FIG. 2, is opened when the pipe 3 assumes the position shown in FIG. 2 and when the claws 17 engage and grip the central portion of the pipe. This valve admits testing fluid from a source including a supply conduit 30 into a central bore or passage 31 provided in the stationary carrier 1. Such testing fluid is allowed to flow through the pipe 3 and is discharged through a normally open valve 32 provided in the reciprocable carrier 2. Once the interior of the pipe 3 is rinsed to flush away dust or other impurities, the valve 32 is closed whereby the pressure of testing fluid in the pipe 3 and in the bore 31 rises. The channels 24 and 23 admit compressed testing fluid into the cylinder chambers 21a so that the cylinders 21 move toward each other and the rollers 20 cause the jaws 18a–18d to engage the adjoining portions of the pipe. At the same time, the central portion of the pipe 3 is supported against bending by the claws 17 of the gripping device 17a which is mounted on the platen 9.

Upon completion of testing operation, the valve 32 is opened so that the pressure of testing fluid decreases and the springs 22 are free to return the cylinders 21 back to their starting positions whereby the jaws 18a–18d are disengaged from the pipe. In the next step, the motor 8 begins to run and rotates the spindles 4 and 5 in a sense to move the carrier 2 in a direction to the right, as viewed in FIG. 2, so that the sealing head 2a moves away from the right-hand end of the pipe 3a because the platen 9 follows at half the speed of the carrier 2. The claws 17 continue to grip the pipe 3 so that the left-hand end portion of the pipe is withdrawn from the sealing head 1a and advances in a direction to the right beyond the left-hand set of clamping jaws 18a–18d. In the next-following step, the claws 17 of the gripping device 17a are moved away from each other to release the pipe 3. This is effected by rotating the spindle 17b in a sense to move the nuts 17c, 17d away from each other. In other words, the pipe 3 is now supported solely by the holders 28 which are mounted on a shaft 33, see FIGS. 2 and 4. The shaft 33 is driven at requisite intervals by a second hydraulic motor 34 which causes the holders 28 to pivot in a counterclockwise direction, as viewed in FIG. 4, and to transfer the freshly tested pipe onto the inclined surfaces of fixed guides 35. The pipe rolls along the guides 35 and comes to rest on a second magazine or grate 36. The driving connection between the motor 34 and shaft 33 comprises a worm 37 which is rotated by the motor 34, and a worm wheel 38 which is mounted on the shaft 33 and meshes with the worm 37.

The valves 29 and 32, the motors 8 and 34, the spindle 17b, and the device which rocks the transfer members 26 may be actuated in a predetermined sequence by a suitable control system, not shown, so that the apparatus may be operated in a fully automatic way. When the testing apparatus detects a defective pipe, the holders 28 may be pivoted in a clockwise direction, as viewed in FIG. 4, so as to discard such defective pipe. Other means for ejecting or removing defective pipes may be provided if desired.

As shown in FIG. 2, the internal diameters of the sealing heads 1a, 2a exceeds the external diameter of the pipe 3 so that such heads may be used in connection with pipes whose diameters are smaller or larger than the diameter of the pipe 3. Also, the jaws 18a–18d and the claws 17 can perform strokes of such length that they will safely engage pipes having different diameters. Thus, the apparatus need not be furnished with spare sets of gripping and/or clamping devices. The clamping force of the jaws 18a–18d is directly proportional to the pressure of testing fluid since such fluid causes the cylinders 21 to rock the levers 19 and to maintain the jaws in clamping engagement with the pipe.

The compressive force which is transmitted by the motor 8 and maintains the heads 1a and 2a in sealing engagement with the respective end portions of the pipe is just sufficient to prevent leakage of testing fluid from a satisfactory pipe. Such compressive force must be applied with great care, particularly if the walls of the pipes are thin, because excessive compression could result in permanent damage to the workpieces.

The rollers 20 may be mounted on the arms 19b if the cylinders 21 are provided with conical end portions which engage the rollers to thereby tilt the levers 19 in response to admission of testing fluid into the chambers 21a. Also, the spindle 17b could be driven by a transmission connected to the motor 8 or 34.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. An apparatus for detecting leakage leaks in tubular workpieces by means of a testing fluid, comprising a first carrier and a movable carrier; a hollow sealing member on each carrier and each adapted to sealingly engage one end of a workpiece which is placed between said carriers; means for reciprocating said movable carrier toward and away from said first carrier so that the sealing members engage the workpiece when the movable carrier is advanced sufficiently close to said first carrier; jaw means provided on each carrier and each movable into and out of clamping engagement with a portion of the workpiece adjacent the respective sealing member; a source of pressurized testing fluid; means for admitting such fluid through one of said sealing members and into the workpiece; means for selectively preventing escape of fluid through the other sealing member so that the fluid pressure in a satisfactory workpiece rises; actuating means operatively connected with said source for moving said jaw means against the workpiece with a force which is proportional to the fluid pressure in the workpiece; gripping means disposed between said carriers for engaging an intermediate portion of that workpiece whose ends are engaged by said sealing members; and means responsive to movements of said movable carrier for moving said gripping means toward and away from said first carrier proportional to movement of said movable carrier, but at a speed which is less than the speed of said movable carrier.

2. An apparatus for detecting leaks in tubular workpieces by means of a testing fluid, comprising a first carrier and a movable carrier; a hollow sealing member provided on each said carriers and each adapted to sealingly engage one end of a workpiece which is placed between said carriers; means for reciprocating said movable carrier toward and away from said first carrier so that the sealing members engage the respective ends of the workpiece when the movable carrier is advanced sufficiently close to said first carrier; a source of pressurized testing fluid; means for admitting such fluid through one of said sealing members and into the workpiece; means selectively preventing escape of testing fluid through the other sealing member so that the fluid pressure in a satisfactory workpiece rises; gripping means disposed between said carriers for engaging an intermediate portion of that workpiece whose ends are engaged by said sealing members; and means responsive to movements of said movable carrier for moving said gripping means toward and away from said first carrier proportional to movement of said movable carrier, but at a speed which is less than the speed of said movable carrier.

3. An apparatus for detecting leaks in tubular workpieces by means of a hydraulic testing fluid, comprising a first carrier and a second carrier, said second carrier being reciprocable in a straight path toward and away from said first carrier and each of said carriers comprising a hollow sealing member adapted to sealingly engage one end of a workpiece which is placed between said carriers; drive means including at least one rotary threaded spindle for reciprocating said second carrier so that the sealing members engage the respective ends of the workpiece when the second carrier is moved sufficiently close to said first carrier; a plurality of clamping jaws provided on each of said carriers and each of said jaws being movable substantially radially into and out of clamping engagement with a portion of the workpiece which is adjacent to the respective sealing member; a source of pressurized testing fluid; means for admitting such fluid through one of said sealing members and into the workpiece; means for selectively preventing escape of testing fluid through the other sealing member so that the fluid pressure in a satisfactory workpiece rises; hydraulic actuating means operatively connected with said source for moving said jaws against the workpiece with a force which is directly proportional to the fluid pressure in the workpiece; gripping means disposed between said carriers for engaging an intermediate portion of that workpiece whose ends are engaged by said sealing members; and means responsive to movement of said movable carrier for moving said gripping means toward and away from said first carrier proportional to movement of said movable carrier, but at a speed which is less than the speed of said movable carrier.

4. An apparatus for detecting leaks in tubular workpieces by means of a hydraulic testing fluid, comprising a first carrier and a second carrier, said second carrier being reciprocable in a straight path toward and away from said first carrier and each carrier comprising a hollow sealing member adapted to sealingly engage one end of a workpiece which is placed between said carriers; means for reciprocating said second carrier toward and away from said first carrier so that the sealing members engage the respective ends of the workpiece when the second carrier is moved sufficiently close to the first carrier; a plurality of two-armed levers rockably mounted on each of said carriers; a jaw provided on one arm of each lever and each such jaw being movable substantially radially into and out of clamping engagement with a portion of the workpiece which is adjacent to the respective sealing member; a source of pressurized testing fluid; means for admitting such fluid through one of said sealing members and into the workpiece; means for selectively preventing escape of testing fluid through the other sealing member so that the fluid pressure in a satisfactory workpiece rises; and hydraulic actuating means for moving said jaws against the workpiece with a force which is directly proportional to the fluid pressure in the workpiece, said actuating means comprising a hydraulic cylinder movably mounted on each of said carriers and defining a cylinder chamber communicating with the interior of a workpiece which is engaged by said sealing members, each of said cylinders being movable in response to increasing pressure of testing fluid in the workpiece to engage the other arms of the respective levers and to urge the corresponding jaws into clamping engagement with the workpiece.

5. An apparatus for detecting leaks in tubular workpieces by means of hydraulic testing fluid, comprising a first carrier and a second carrier, said second carrier being reciprocable in a straight path toward and away from said first carrier and each carrier comprising a hollow sealing member adapted to sealingly engage one end of a workpiece which is placed between said carriers; means for reciprocating said second carrier toward and away from said first carrier so that the sealing members engage the respective ends of the workpiece when the second carrier is moved sufficiently close to the first carrier; a plurality of two-armed levers rockably mounted on each of said carriers; a jaw provided on one arm of each lever and each such jaw being movable substantially radially into and out of clamping engagement with a portion of the workpiece which is adjacent to the respective sealing member; a source of pressurized testing fluid; means for admitting such fluid through one of said sealing members and into the workpiece; means selectively preventing escape of testing fluid through the other sealing member so that the fluid pressure in a satisfactory workpiece rises; and hydraulic actuating means for moving said jaws against the workpiece with a force which is directly proportional to the fluid pressure in the workpiece, said actuating means comprising a hydraulic cylinder axially movably mounted on each of said carriers and defining a cylinder chamber communicating with the interior of a workpiece which is engaged by said sealing members, each of said cylinders being movable axially in a first direction in response to increasing pressure of testing fluid in the workpiece to engage the other arms of the respective levers and to urge the corresponding jaws into clamping engagement with the workpiece, and means for biasing said cylinders in the opposite direction so that the clamping action of said jaws upon the workpiece decreases in response to decreasing fluid pressure in the workpiece.

6. An apparatus as set forth in claim 5, wherein the other arm of each lever is provided with a cam face and wherein each of said cylinders carries a plurality of motion transmitting rollers which engage said cam faces and rock the levers in response to axial movement of the cylinders in said first direction.

7. An apparatus as set forth in claim 5, wherein the levers on each of said cariers are equidistant from each other and wherein each of said jaws is articulately connected with the one arm of the respective lever.

8. An apparatus for detecting leaks in tubular workpieces by means of a testing fluid, comprising a first carrier and a movable carrier; a hollow sealing member on each carrier and each adapted to sealingly engage one end of a workpiece which is placed between said carriers; means for reciprocating said movable carrier in a straight path toward and away from said first carrier so that the sealing members engage the workpiece when the movable carrier is advanced sufficiently close to said first carrier; a source of pressurized testing fluid; means for admitting such fluid through the sealing member on said first carrier and into the workpiece; means for selectively preventing escape of fluid through the sealing member of said movable carrier so that the fluid pressure in a satisfactory workpiece rises; gripping means disposed between said carriers for engaging an intermediate portion of that workpiece whose ends are engaged by said sealing members; and means responsive to movement of said movable carrier for moving said gripping means toward and away from said first carrier proportional to movement of said movable carrier, but at a speed which is less than the speed of said movable carrier.

9. An apparatus for detecting leaks in tubular workpieces by means of a testing fluid, comprising a first carrier and a movable carrier; a hollow sealing member on each carrier and each adapted to sealingly engage one end of a workpiece which is placed between said carriers; drive means including at least one elongated rotary threaded spindle extending between said carriers and meshing with said movable carrier to move the latter toward or away from said first carrier so that the sealing members engage the workpiece when the movable carrier is advanced sufficiently close to said first carrier, and means for rotating said spindle in a clockwise or counterclockwise direction; a supporting member reciprocably mounted intermediate said carriers; transmission means provided between said spindle and said supporting member for moving said supporting member in the same direction as said movable carrier when said spindle rotates; gripping means provided on said supporting member and comprising claw means movable into and out of gripping engagement with the median portion of a workpiece whose ends are engaged by said sealing members; jaw means provided on each carrier and each movable into and out of clamping engagement with a portion of the workpiece adjacent the respective sealing member, a source of pressurized testing fluid; means for admitting such fluid through one of said sealing members and into the workpiece; means for selectively preventing escape of fluid through the other sealing member so that the fluid pressure in a satisfactory workpiece rises; and actuating means operatively connected with said source for moving said jaw means against the workpiece with a force which is proportional to the fluid pressure in the workpiece.

10. An apparatus as set forth in claim 9, wherein said supporting member is a platen which is located exactly midway between said carriers.

11. An apparatus as set forth in claim 9, wherein said transmission means is a step-down transmission which drives said supporting member at half the speed of said movable carrier.

12. An apparatus as set forth in claim 11, wherein said transmission comprises a first gear axially movably mounted on and rotatable with said spindle, an elongated rod parallel with said spindle, a hollow shaft rotatably mounted on said rod, a second gear mounted on said hollow shaft and meshing with said first gear, a third gear mounted on said hollow shaft, and a fourth gear rotatably mounted in said supporting member and meshing with said third gear.

13. An apparatus as set forth in claim 9, wherein said drive means comprises a plurality of parallel spindles and a reversible hydraulic motor drivingly connected with said spindles, said supporting member comprising a plurality of rigidly mounted spindle nuts each of which meshes with one of said spindles.

14. An apparatus for detecting leaks in tubular workpieces by means of a testing fluid, comprising a first carrier and a movable carrier; a hollow sealing member on each carrier and each adapted to sealingly engage one end of a workpiece which is placed between said carriers; means for reciprocating said movable carrier toward and away from said first carrier so that the sealing members engage the workpiece when the movable carrier is advanced sufficiently close to said first carrier; jaw means provided on each carrier and each movable into and out of clamping engagement with a portion of the workpiece adjacent the respective sealing member; a source of pressurized testing fluid; first valve means provided in said first carrier for admitting such fluid through the respective sealing member and into the workpiece; second valve means provided in said movable carrier for selectively preventing escape of fluid through the respective sealing member so that the fluid pressure in a satisfactory workpiece rises; actuating means operatively connected with said source for moving said jaw means against the workpiece with a force which is proportional to the fluid pressure in the workpiece; gripping means provided between said carriers for engaging an intermediate portion of that workpiece whose ends are engaged by said sealing members; and means for moving said gripping means toward and away from said first carrier in response to similar movements of said movable carrier but at a speed which is less than the speed of said movable carrier.

References Cited
UNITED STATES PATENTS

| | | | |
|---|---|---|---|
| 1,851,345 | 3/1932 | Brown et al. | 73—49.1 XR |
| 2,196,317 | 4/1940 | Longstreet | 73—49.1 |
| 2,896,445 | 7/1959 | McNabb | 73—49.6 |
| 3,118,546 | 1/1964 | McConnell et al. | 73—49.1 XR |

FOREIGN PATENTS

| | | |
|---|---|---|
| 809,857 | 5/1951 | Germany. |

LOUIS R. PRINCE, *Primary Examiner.*

JEFFREY NOLTON, *Assistant Examiner.*